US006283534B1

(12) United States Patent
Mrozowski et al.

(10) Patent No.: US 6,283,534 B1
(45) Date of Patent: Sep. 4, 2001

(54) ACTIVE DOOR UPPER

(75) Inventors: Joseph E. Mrozowski, Clarkston; John P. Pacella, Rochester Hills; Earl E. Kansier, White Lake, all of MI (US)

(73) Assignee: The Budd Company, Troy, MI (US)

( * ) Notice: Subject to any disclaimer, the term of this patent is extended or adjusted under 35 U.S.C. 154(b) by 0 days.

(21) Appl. No.: 09/624,704

(22) Filed: Jul. 24, 2000

(51) Int. Cl.[7] ................................ B60J 1/14; B60J 10/08; E05F 11/38

(52) U.S. Cl. ........................... 296/146.2; 49/352; 49/501; 296/146.5

(58) Field of Search ............................. 296/146.2, 146.5, 296/149.9, 146.11; 49/501, 352

(56) References Cited

U.S. PATENT DOCUMENTS

| | | | | |
|---|---|---|---|---|
| 3,004,303 | | 10/1961 | Wilmer | 49/249 |
| 3,628,216 | | 12/1971 | Savell | 16/287 |
| 3,848,293 | | 11/1974 | Marchione et al. | 16/297 |
| 4,420,906 | * | 12/1983 | Pickles | 49/352 |
| 4,707,007 | | 11/1987 | Inoh | 292/341.16 |
| 4,730,414 | * | 3/1988 | Nakamura et al. | 49/348 |
| 4,761,915 | | 8/1988 | Marz | 49/374 |
| 4,775,178 | | 10/1988 | Boyko | 292/341.16 |
| 4,785,582 | * | 11/1988 | Tokue et al. | 49/211 |
| 4,800,638 | | 1/1989 | Herringshaw et al. | 29/407 |
| 4,827,671 | | 5/1989 | Herringshaw et al. | 49/503 |
| 4,842,313 | | 6/1989 | Boyko et al. | 292/341.16 |
| 4,956,942 | | 9/1990 | Lisak et al. | 49/502 |
| 4,984,389 | | 1/1991 | Benoit et al. | 49/502 |
| 5,009,461 | * | 4/1991 | Smith-Horn et al. | 296/146.2 |
| 5,038,519 | * | 8/1991 | Huebner | 49/375 |
| 5,066,056 | | 11/1991 | Schap | 292/341.16 |
| 5,525,875 | | 6/1996 | Nakamura et al. | 318/266 |
| 5,927,021 | | 7/1999 | Kowlaski et al. | 49/502 |

FOREIGN PATENT DOCUMENTS

| | | |
|---|---|---|
| 40 32 171 C2 | 4/1991 | (DE) . |
| 40 20 746 A1 | 1/1992 | (DE) . |
| 43 34 081 C2 | 4/1995 | (DE) . |
| 0 304 768 A2 | 3/1989 | (EP) . |
| 0 304 769 A2 | 3/1989 | (EP) . |
| 0 385 197 B1 | 3/1992 | (EP) . |
| 1197209 | 11/1959 | (FR) . |
| 58-185318 | 10/1983 | (JP) . |
| 60-209321 | 10/1985 | (JP) . |
| 62-63786 | 3/1987 | (JP) . |
| 63-43824 | 2/1988 | (JP) . |
| 2-129910 | 10/1990 | (JP) . |

* cited by examiner

*Primary Examiner*—D. Glenn Dayoan
*Assistant Examiner*—Paul Chenevert
(74) *Attorney, Agent, or Firm*—Harness, Dickey & Pierce, P.L.C.

(57) ABSTRACT

A closure member assembly for a vehicle having a vehicle body that defines an aperture. The closure member assembly is positionable between a first position wherein the closure member assembly substantially closes the aperture and a second position wherein the closure member assembly substantially clears the aperture. The closure member assembly includes a first structure, a second structure and a drive mechanism. The first structure is movably coupled to the vehicle body. The second structure is pivotably coupled to the first structure about a generally horizontal pivot axis. The drive mechanism is coupled to one of the first and second structures and operable in an actuated condition for pivoting the second structure about the generally horizontal pivot axis.

19 Claims, 4 Drawing Sheets

ACTIVE DOOR UPPER

BACKGROUND OF THE INVENTION

1. Technical Field

The present invention relates generally to a vehicle door apparatus and more particularly to a vehicle door apparatus having a movable window portion which atomically adjusts to a vehicle body structure.

2. Background Art

Manufacturers of motor vehicles have long been faced with the difficult task of constructing a door assembly which not only generates a high quality seal against the vehicle body but also is easy to install and operate. Conventionally, the process of installing a door assembly includes the hanging of the door assembly onto a vehicle body and adjusting of the door assembly to contact a weatherstrip seal between the vehicle body and the door assembly.

The process of adjusting the vehicle doors is typically labor intensive and tedious, especially where a high quality seal is desired due to the relatively small tolerances on the fit of the vehicle door to the vehicle body that a technician will typically have to work with. Furthermore, a substantial amount of experience is usually necessary before a technician is able to reliably adjust vehicle doors with a minimum of adjusting iterations. Accordingly, there is a need in the art for a vehicle door assembly which generates a high quality seal but which is relatively easier to install.

Another drawback associated with the modern vehicle doors that provide high quality seals is the amount of effort that is required to close the door assembly. The high quality seal is typically generated via a body weatherstrip around a substantial portion of the door assembly to block the infiltration of wind, debris and noise into the vehicle passenger compartment and as such, a relatively large force is required to compress the body weatherstrip when generating the high quality seal. Trade-offs in the design of the seal, such as the use of a more resilient but less effective sealing material, are frequently made to ensure that the effort to close the door assembly will not be too high. These trade-offs reduce the overall quality of the seal and still require substantial effort to close the door assembly. Accordingly, there also remains a need in the art for a door assembly which provides a high quality seal but which is also relatively easy to close.

SUMMARY OF THE INVENTION

In one preferred form, the present invention provides a closure member assembly for a vehicle having a vehicle body that defines an aperture. The closure member assembly is positionable between a first position wherein the closure member assembly substantially closes the aperture and a second position wherein the closure member assembly substantially clears the aperture. The closure member assembly includes a first structure, a second structure and a drive mechanism. The first structure is movably coupled to the vehicle body. The second structure is pivotably coupled to the first structure about a generally horizontal pivot axis. The drive mechanism is coupled to one of the first and second structures and operable in an actuated condition for pivoting the second structure about the generally horizontal pivot axis.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
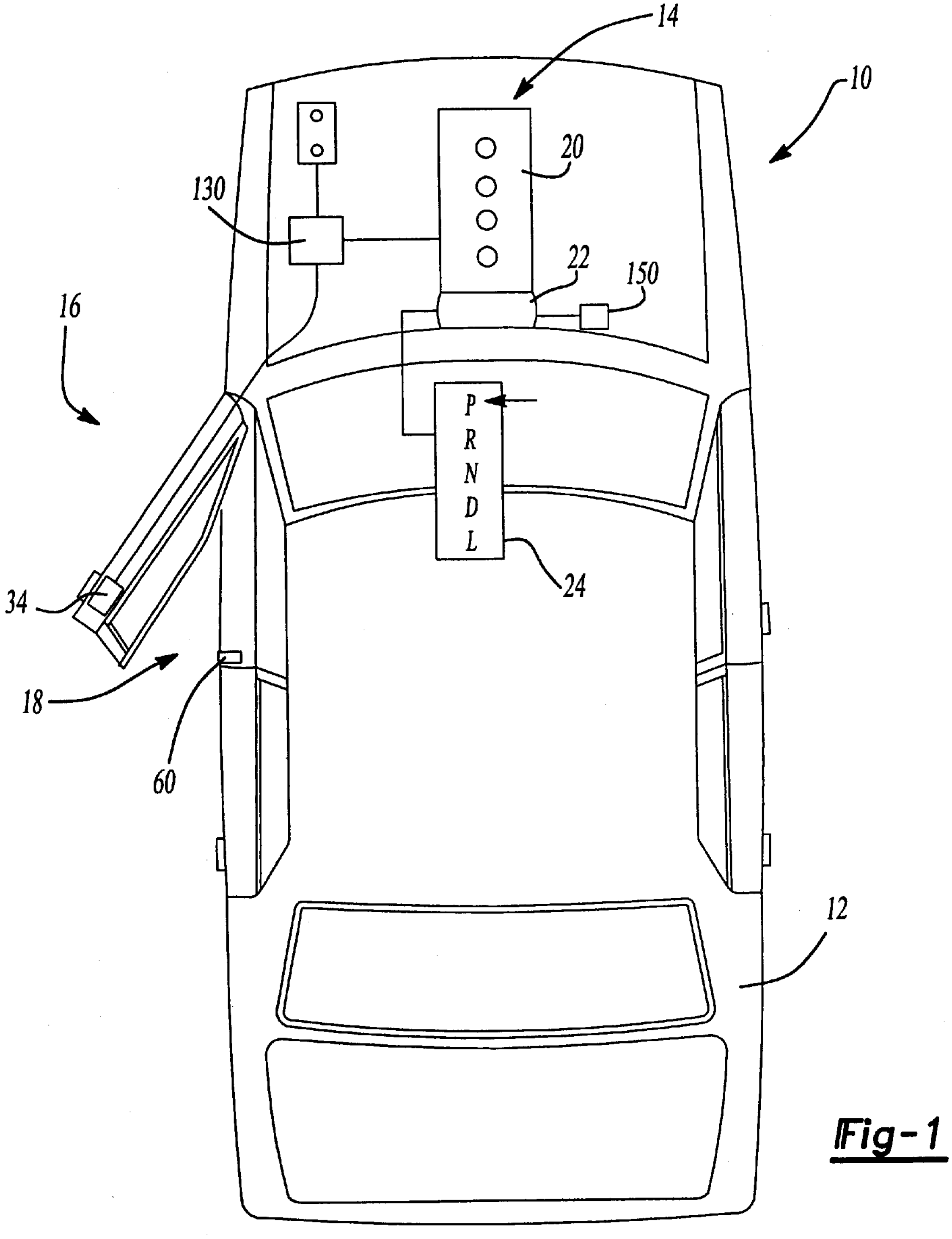
FIG. 1 is a schematic illustration of a vehicle constructed in accordance with the teachings of the present invention.

With reference to FIG. 1 of the drawings, an illustrative vehicle constructed in accordance with the teachings of the present invention is generally indicated by reference numeral 10. Vehicle 10 is shown to include a vehicle body 12, a drive means 14 and a closure member assembly 16. Vehicle body 12 is conventionally formed from a sheet metal material to define an aperture 18 for ingress to and egress from vehicle 10. Drive means 14 is coupled to vehicle body 12 and includes a source of propulsion, such as a motor or internal combustion engine 20 and a transmission 22. Transmission 22 is otherwise conventional in its construction and operation and includes a plurality of gear ratios 24 which are selectively engagable via a transmission shift lever (not shown).

Closure member assembly 16 is illustrated to be movably coupled to vehicle body 12 to permit closure member assembly 16 to pivot or translate between a closed position wherein closure member assembly 16 substantially closes aperture 18 and an open position wherein closure member assembly 16 substantially clears aperture 18. With additional reference to FIG. 2, closure member assembly 16 is shown to include a first structure 30, a second structure 32, a latch mechanism 34, a plurality of pivot pins 36, a drive mechanism 38, a window regulator 40 and a window assembly 42.

First structure 30 is illustrated to be a generally rectangular weldment that is pivotably coupled to vehicle body 12 via a plurality of hinges (not shown). A pair of generally vertically extending side members 50 form the opposite sides of first structure 30. A belt reinforcement member 52 is coupled to and extends between the top portion of the side members 50. A lower support member 54 is coupled to and extends between the bottom portion of the side members 50. An intrusion beam 56, which is spaced between belt reinforcement member 52 and lower support member 54, extends between and is coupled to the side members 50. Side members 50, belt reinforcement member 52 and lower support member 54 are fabricated from stamped sheet metal but may also be formed from other materials, such as tubular stock which is bent or hydroformed as necessary.

Latch mechanism 34 is fixedly coupled to first structure 30 and operable for engaging a striker 60 that is coupled to vehicle body 12. Latch mechanism 34 is well known in the art and need not be discussed in detail. Briefly, latch mechanism 34 is changeable between a latched condition, wherein latch mechanism 34 is releasably engaged to striker 60, and an unlatched condition.

Second structure 32 is also illustrated to be a weldment, but having an upper portion 64 and a reaction portion 66. In the particular embodiment illustrated, upper portion 64 includes a window frame 70 and a pair of attachment lugs 72. Window frame 70 generally defines a window opening 76 and is surrounded by a window weatherstrip seal 78. Each of the attachment lugs 72 is positioned in alignment with an end of the belt reinforcement member 52 and includes a pin aperture (not specifically shown). A pivot pin 36 extends through each of the pin apertures and is fixedly coupled to belt reinforcement member 52. The pin apertures are sized slightly larger in diameter than pivot pins 36 to thereby permit second structure 32 to pivot relative first structure 30 about the generally horizontal pivot axis 84 formed by pivot pins 36.

Reaction portion 66 includes a reaction member 90 that is configured to convert an input force from drive mechanism 38 into a torque moment for pivoting second structure 32 about the generally horizontal pivot axis 84. Preferably, reaction portion 66 is also configured to permit window assembly 42 and drive mechanism 38 to be mounted thereto. In the particular example illustrated, reaction portion 66 is generally L-shaped, having a generally vertically disposed leg member 92 and a generally horizontal base member 94. Leg member 92 is coupled to upper portion 64 at a first end and forms the forward boundary of window opening 76. To improve the aesthetics of closure member assembly 16, a trim cover 96 may be employed to conceal the intersection between leg member 92 and upper portion 64. Base member 94 is coupled to the opposite end of leg member 92 and jogs slightly outwardly away from first structure 30 after the intersection between leg member 92 and base member 94 to avoid contacting first structure 30. Base member 94 serves as the mounting location for the window regulator 40, with the window regulator's pair of regulator slide rails 98 for guiding window assembly 42 as it translates vertically in window frame 70 being coupled to opposite ends of base member 94.

As mentioned above, reaction member 90 is configured to convert an input force from drive mechanism 38 into a torque moment for pivoting second structure 32 about the generally horizontal pivot axis 84. Reaction member 90 is preferably positioned in second structure 32 in a spaced apart relation to generally horizontal pivot axis 84 to permit second structure 32 to apply a sealing force 98 (FIG. 3) having a magnitude which exceeds a magnitude of the input force. In this regard, leg member 92 is sized to effectively multiply the input force to obtain a predetermined desired sealing force. Construction in this manner permits the cost and size of drive mechanism 38 to be minimized. In the particular embodiment illustrated, reaction member 90 is integrated into base member 94.

Figure 2:
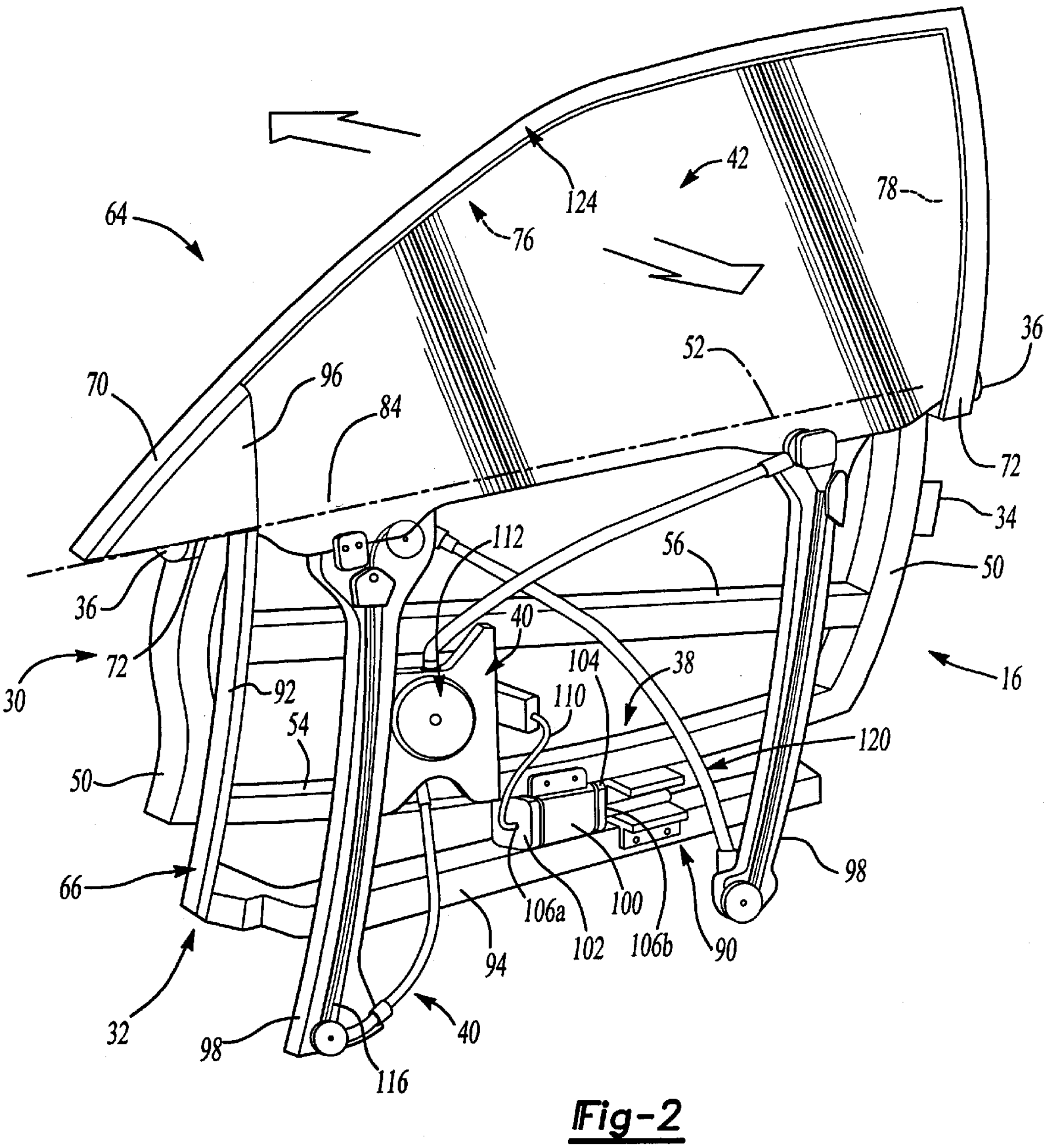
FIG. 2 is an exploded perspective view of a portion of the vehicle of FIG. 1, illustrating the closure member assembly.

With reference to FIG. 2, drive mechanism 38 is illustrated to include a drive motor 100 and first and second clutch units 102 and 104, respectively. Drive motor 100 is a reversible DC electric motor which is illustrated to be coupled to base member 94. Those skilled in the art will understand, however, that drive motor 100 may alternatively be coupled to first structure 30. First and second clutch units 102 and 104 are coupled to an output shaft (not shown) of drive motor 100 and are selectively and independently operable in an engaged condition and a disengaged condition. Operation of the first and second clutch units 102 and 104 in the engaged condition permits their associated output member 106a and 106b, respectively, to rotate in response to a rotary input from drive motor 100. Operation of the first and second clutch units 102 and 104 in the disengaged condition renders output member 106*a* and 106*b* unresponsive to the rotary input from drive motor 100.

Figure 3:
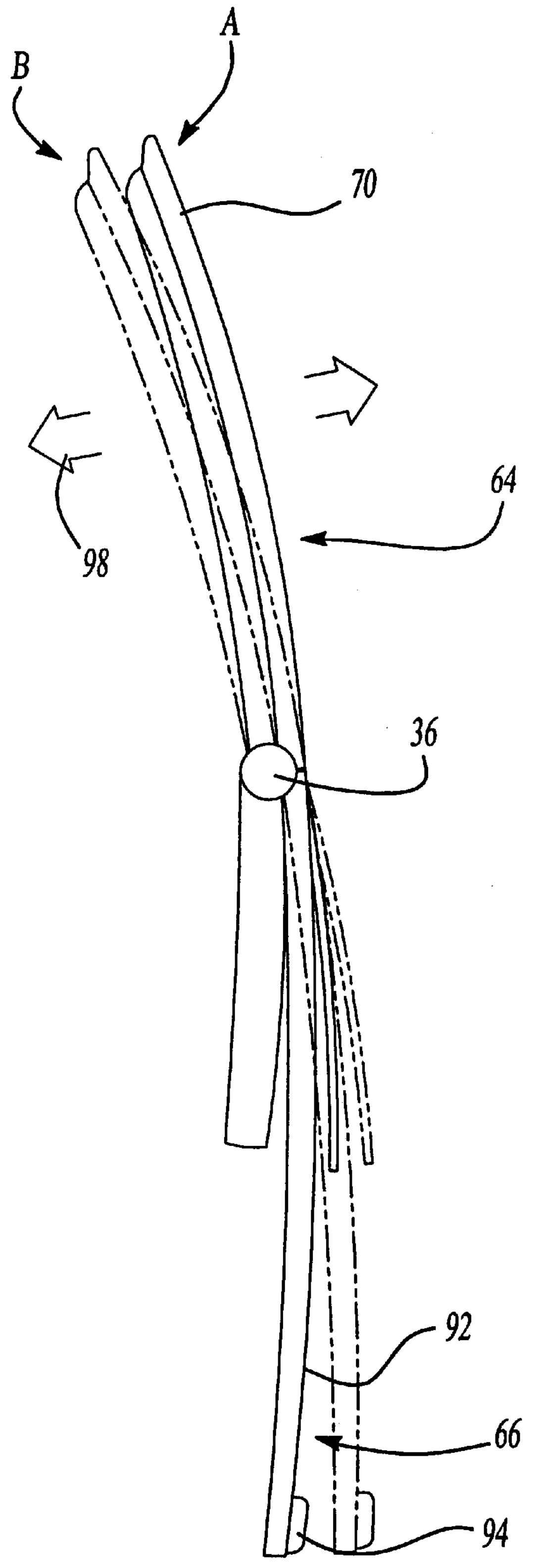
FIG. 3 is an end view of a portion of the vehicle of FIG. 1, illustrating the upper portion of the closure member assembly pivoting between the first and second pivot positions.

A flexible drive cable 110 couples the output member 106*a* of first clutch unit 102 to the drum unit 112 of window regulator 40. Rotation of the output member 106*a* of first clutch unit 102 is therefore operable for rotating drum unit 112 to cause a cable 116 within regulator slide rails 98 to vertically translate window assembly 42 in a manner that is well known in the art. The output member 106*b* of second clutch unit 104 is coupled to a positioning device 120 which is operable for positioning base member 94 between first and second positions A and B as illustrated in FIG. 3.

Figure 4A:
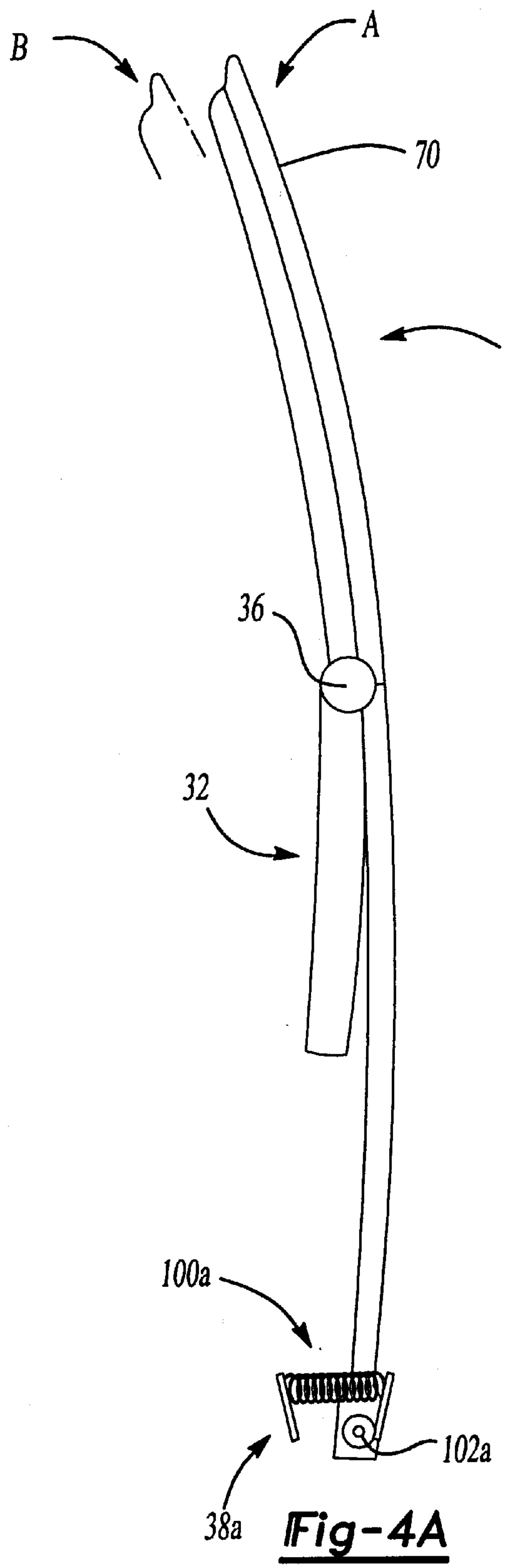
FIG. 4A is an end view of a portion of a vehicle similar to that of FIG. 3 but illustrating a first alternate drive mechanism.
Figure 4B:
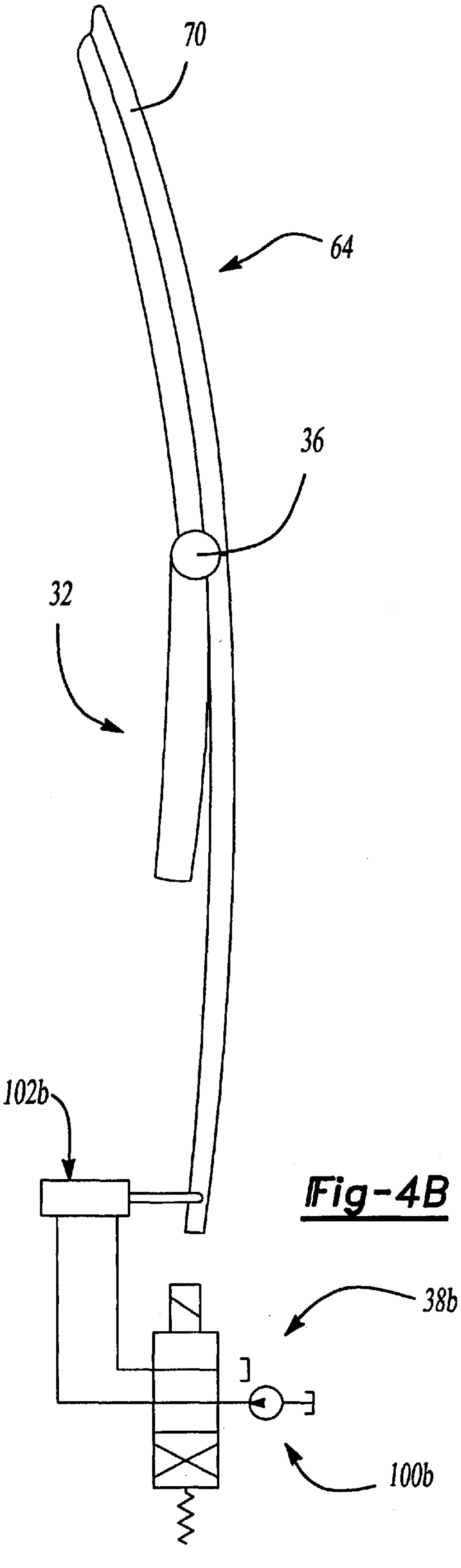
FIG. 4B is an end view of a portion of a vehicle similar to that of FIG. 3 but illustrating a second first alternate drive mechanism.
Figure 5:
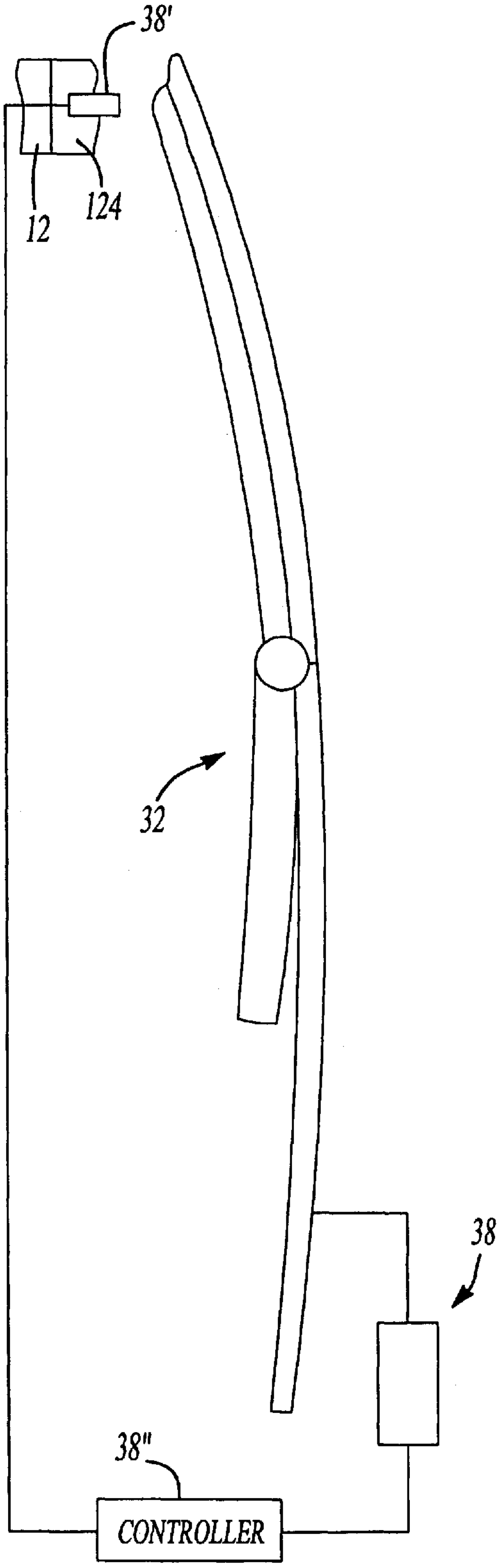
FIG. 5 is a schematic illustration of a portion of the vehicle of FIG. 1, illustrating the drive mechanism.

Those skilled in the art will understand that drive mechanism 38 may be constructed somewhat differently so as to accommodate various design goals. In FIG. 4A, for example, drive mechanism 38*a* is illustrated to include a spring 100*a* and a torsion bar 102*a* which are operable for applying a force to second structure 32 to bias second structure 32 in second position B. In FIG. 4B, drive mechanism 38*b* is shown to include a fluid power source 100*b* and a fluid actuator 102*b*. Fluid power source 100*b* is illustrated to be a hydraulic pump but may also be an air compressor. Fluid actuator 102*b* is illustrated to be a hydraulic cylinder but may also be another linear or a rotary fluid actuator. Other types of drive mechanisms which may be employed for drive mechanism 38 include motor-pulley-cable arrangements, motor-driven worm or lead screw arrangements, motor-driven gear arrangements, etc. These types of drive mechanisms are well known in the art and need not be discussed in detail.

In operation, drive mechanism 38 is actuated to position second structure 32 in the first position A when closure member assembly 16 is positioned in the open condition. Upon the placement of closure member assembly 16 into the closed position, as determined, for example, by the placement of latch mechanism 34 in the latched condition, drive mechanism 38 is actuated to cause positioning device 120 to position second structure 32 in the second position B. Placement of second structure 32 in the second position B permits window frame 70 to exert a sealing force 98 against a door aperture weatherstrip 124 that is positioned between vehicle body 12 and closure member assembly 16. Subsequent positioning of closure member assembly 16 toward the open position, as determined, for example, by the placement of latch mechanism 34 in the unlatched condition, triggering drive mechanism 38 to actuate and cause positioning device 120 to position second structure 32 in the first position A. Construction in this manner permits the generation of a relatively high quality seal while minimizing the effort to position closure member assembly 16 in the closed position. Furthermore, a high quality seal is achieved without the need to adjust the lateral position of the window frame 70 to the vehicle body.

In the arrangements where drive mechanism 38 is actuatable to deposition second structure 32 (e.g., drive mechanism 38 as shown in FIG. drive mechanism 38*b* as shown in FIG. 4B), drive mechanism 38 preferably also includes a seal sensor 38' and a controller 38". Seal sensor 38' is operable for sensing a characteristic related to the quality of the seal generated by door aperture weatherstrip 124 and generating a sensor signal in response thereto. The characteristic related to the quality of the seal may be the position of the second structure 32 relative to the vehicle body 12 or the force that the second structure 32 exerts on the door aperture weatherstrip 124. Accordingly, seal sensor 38' may be a limit switch or a pressure switch. Controller 38" receives the sensor signal and controls the operation of the portion of the drive mechanism 38 that positions the second structure 32 (e.g., drive motor 100 and second clutch unit 104; fluid power source 100*b*) so as to reposition second structure 32 as necessary to achieve a seal having a desired level of quality.

Alternatively or additionally, a vehicle signal may be employed as part of the triggering of drive mechanism 38. One vehicle signal may be a speed signal generated by a controller 130 (FIG. 1) which indicates that the speed of vehicle 10 exceeds a predetermined vehicle speed such as five miles per hour. Another vehicle signal may be a gear ratio signal generated by controller 130 indicating that transmission 22 has been positioned out of a "park" setting and into a gear ratio 24 that transmits drive torque to the vehicle wheels (not shown). Yet another vehicle signal may be an ignition signal generated by controller 130 indicating that engine 20 is operating. A further vehicle signal may be the operation of a ventilation blower 150 above a redetermined blower speed.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. For example, those skilled in the art will understand that second structure 32 may alternatively be constructed such that upper portion 64 does not include a window frame 70. In such arrangements, window assembly 42 will pivot about first structure 30 and sealingly engage the door aperture weatherstrip 124. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A closure member assembly for a vehicle having a vehicle body, the vehicle body defining an aperture, the closure member assembly positionable between a first position wherein the closure member assembly substantially closes the aperture and a second position wherein the closure member assembly substantially clears the aperture, the closure member assembly comprising:

a first structure adapted to be movably coupled to the vehicle body;

a second structure pivotably coupled to the first structure about a generally horizontal pivot axis;

a window regulator coupled to the second structure, the window regulator having a window member movably coupled thereto; and a drive mechanism coupled to one of the first and second structures, the drive mechanism operable in an actuated condition for pivoting the second structure about the generally horizontal pivot axis.

2. The closure member assembly of claim 1, wherein the window regulator includes guide rails spaced apart from the second structure to receive the window member.

3. A closure member assembly for a vehicle having a vehicle body, the vehicle body defining an aperture, the closure member assembly positionable between a first position wherein the closure member assembly substantially closes the aperture and a second position wherein the closure member assembly substantially clears the aperture, the closure member assembly comprising:

a first structure adapted to be movably coupled to the vehicle body;

a second structure pivotably coupled to the first structure about a generally horizontal pivot axis; and a drive mechanism coupled to one of the first and second structures, the drive mechanism operable in an actuated condition for pivoting the second structure about the generally horizontal pivot axis wherein the drive mechanism includes a drive motor, the drive motor being operable in first and second modes, the first mode being operable for translating a window member relative to the second structure, the second mode being operable for pivoting the second structure about the generally horizontal pivot axis.

4. The closure member assembly of claim 3, wherein the second structure includes a reaction member for receiving an input force from the drive mechanism, the reaction member being spaced apart from the generally horizontal pivot axis and coupled to the second structure to permit the second structure to apply a sealing force having a magnitude which exceeds a magnitude of the input force.

5. The closure member assembly of claim 4, wherein the drive mechanism is actuated in response to a sealing characteristic.

6. A closure member assembly for a vehicle having a vehicle body, the vehicle body defining an aperture, the closure member assembly positionable between a first position wherein the closure member assembly substantially closes the aperture and a second position wherein the closure member assembly substantially clears the aperture, the closure member assembly comprising:

a first structure adapted to be movably coupled to the vehicle body;

a second structure pivotably coupled to the first structure about a generally horizontal pivot axis; and a drive mechanism coupled to one of the first and second structures, the drive mechanism operable in an actuated condition for pivoting the second structure about the generally horizontal pivot axis wherein the first structure includes a latch mechanism whose condition is changeable between a latched condition and an unlatched condition, the drive mechanism being operated in an actuated condition in response to a change in a condition of the latch mechanism.

7. The closure member assembly of claim 6, wherein the drive mechanism pivots the second structure in a first rotational direction in response to a change in the condition of the latch mechanism from an unlatched condition to a latched condition and wherein the drive mechanism pivots the second structure in a second rotational direction opposite the first rotational direction in response to a change in the condition of the latch mechanism from a latched condition to the unlatched condition.

8. A closure member assembly for a vehicle having a vehicle body, the vehicle body defining an aperture, the closure member assembly positionable between a first position wherein the closure member assembly substantially closes the aperture and a second position wherein the closure member assembly substantially clears the aperture, the closure member assembly comprising:

a first structure adapted to be movably coupled to the vehicle body;

a second structure pivotably coupled to the first structure about a generally horizontal pivot axis; and a drive mechanism coupled to one of the first and second structures, the drive mechanism operable in an actuated condition for pivoting the second structure about the generally horizontal pivot axis wherein the drive mechanism is actuated to pivot the second structure about the generally horizontal pivot axis in response to a vehicle status signal.

9. The closure member assembly of claim 8, wherein the drive mechanism is actuated to pivot the second structure in response to a vehicle status signal selected from a group of vehicle status signals consisting of a gear ratio signal, a speed signal and an ignition signal.

10. A vehicle comprising:

a vehicle body having an aperture;

drive means for propelling the vehicle, the drive means including a transmission; and a closure member assembly coupled to the vehicle body and positionable between a first position wherein the closure member assembly substantially closes the aperture and a second position wherein the closure member assembly substantially clears the aperture, the closure member assembly having a first structure movably coupled to the vehicle body, a second structure pivotably coupled to the first structure about a generally horizontal pivot axis and a drive mechanism coupled to one of the first and second structures, the drive mechanism operable in an actuated condition for pivoting the second structure about the generally horizontal pivot axis in response to a seal quality characteristic.

11. The vehicle of claim 10, wherein the first structure is pivotably coupled to the vehicle body.

12. The vehicle of claim 10, further comprising a window member movably coupled to the second structure.

13. The vehicle of claim 12, wherein the drive mechanism includes a drive motor, the drive motor being operable in first and second modes, the first mode being operable for translating the window member relative to the second structure, the second mode being operable for pivoting the second structure about the generally horizontal pivot axis.

14. The vehicle of claim 13, wherein the second structure includes a reaction member for receiving an input force from the drive mechanism, the reaction member being spaced apart from the generally horizontal pivot axis and coupled to the second structure to permit the second structure to apply a sealing force having a magnitude which exceeds a magnitude of the input force.

15. The vehicle of claim 10, wherein the seal quality characteristic is the position of the second structure relative to the body.

16. A closure member assembly for a vehicle having a vehicle body, the vehicle body defining an aperture, the closure member assembly positionable between a first position wherein the closure member assembly substantially closes the aperture and a second position wherein the closure member assembly substantially clears the aperture, the closure member assembly comprising:

a first structure adapted to be movably coupled to the vehicle body;

a second structure pivotably coupled to the first structure about a generally horizontal pivot axis; and a drive mechanism coupled to one of the first and second structures, the drive mechanism operable in an actuated condition for pivoting the second structure about the generally horizontal pivot axis wherein the first structure includes a latch mechanism whose condition is changeable between a latched condition and an unlatched condition, the drive mechanism being operated in an actuated condition in response to a change in a condition of the latch mechanism.

17. The vehicle of claim 16, wherein the drive mechanism pivots the second structure in a first rotational direction in response to a change in the condition of the latch mechanism from an unlatched condition to a latched condition and wherein the drive mechanism pivots the second structure in a second rotational direction opposite the first rotational direction in response to a change in the condition of the latch mechanism from a latched condition to the unlatched condition.

18. A closure member assembly for a vehicle having a vehicle body, the vehicle body defining an aperture, the closure member assembly positionable between a first position wherein the closure member assembly substantially closes the aperture and a second position wherein the closure member assembly substantially clears the aperture, the closure member assembly comprising:

a first structure adapted to be movably coupled to the vehicle body;

a second structure pivotably coupled to the first structure about a generally horizontal pivot axis; and a drive mechanism coupled to one of the first and second structures, the drive mechanism operable in an actuated condition for pivoting the second structure about the generally horizontal pivot axis wherein the drive mechanism is actuated to pivot the second structure about the generally horizontal pivot axis in response to a vehicle status signal.

19. The vehicle of claim 18, wherein the drive mechanism is actuated to pivot the second structure in response to a vehicle status signal selected from a group of vehicle status signals consisting of a gear ratio signal, a speed signal and an ignition signal.

* * * * *